(12) United States Patent
Kapoor et al.

(10) Patent No.: US 6,516,027 B1
(45) Date of Patent: Feb. 4, 2003

(54) METHOD AND APPARATUS FOR DISCRETE MULTITONE COMMUNICATION BIT ALLOCATION

(75) Inventors: Samir Kapoor, Voorhees, NJ (US); Prashant Choudhary, Notredame, IN (US)

(73) Assignee: NEC USA, Inc., Princeton, NJ (US)

(*) Notice: Subject to any disclaimer, the term of this patent is extended or adjusted under 35 U.S.C. 154(b) by 0 days.

(21) Appl. No.: 09/252,418

(22) Filed: Feb. 18, 1999

(51) Int. Cl.$^7$ .............................. H04B 3/46; H04L 25/03
(52) U.S. Cl. ........................................ 375/227; 379/296
(58) Field of Search ................................. 375/227, 222, 375/225, 228, 219, 278, 296, 295, 224; 370/252, 484, 487; 379/93.26, 93.28; 455/59, 57.3

(56) References Cited

U.S. PATENT DOCUMENTS 5,812,599 A * 9/1998 Van Kerckhove ........... 375/260
6,130,882 A * 10/2000 Levin ......................... 370/252
6,275,522 B1 * 8/2001 Johnson et al. ............. 375/224

OTHER PUBLICATIONS

J.M. Cioffi et al., "Tutorial 5 New Access Technologies: XDSL and other," pp. 1–172, IEEE Infocom '98, The Conference on Computer Communications.

* cited by examiner

Primary Examiner—Chi Pham
Assistant Examiner—Khai Tran
(74) Attorney, Agent, or Firm—Ostrolenk, Faber, Gerb & Soffen, LLP

(57) ABSTRACT

A method and apparatus for allocating bits to subchannels in a discrete multitone environment. The method employs the use of precalculated and prestored look-up tables which take into account a desired bit error rate, signal-to-noise ratio gap for a particular coding scheme, and gain scaling factor. This eliminates the need for the communication device to conduct complex and time consuming calculations. During the training sequence portion of data communication channel establishment, the measured signal-to-noise ratio for each subchannel is compared with values in the precalculated look-up tables to determine the bit allocation for that subchannel. The bit allocation value is stored in a data structure in the communication device. A gain scaling factor for each subchannel is then determined and stored as a data structure. The bit allocation and gain scaling data can then be transmitted to a partner communication device in order to instruct the transmitter how to load each subchannel.

60 Claims, 6 Drawing Sheets

| BITS | SNRdiff (=SNRmaxvec − 250) |
|---|---|
| 1 | −2.4289e+02 |
| 2 | −2.2867e+02 |
| 3 | −2.0022e+02 |
| 4 | −1.4333e+02 |
| 5 | −2.9550e+01 |
| 6 | 1.9801e+02 |
| 7 | 6.5313e+02 |
| 8 | 1.5634e+03 |
| 9 | 3.3839e+03 |
| 10 | 7.0248e+03 |
| 11 | 1.4307e+04 |
| 12 | 2.8771e+04 |
| 13 | 5.7998e+04 |
| 14 | 1.1625e+05 |
| 15 | 2.3277e+05 |

$(P_e/2) = 10^{-7}$

| BITS | SNRvec | SNRmaxvec |
|---|---|---|
| 1 | 9.4580e+00 | 7.1113e+00 |
| 2 | 2.8374e+01 | 2.1334e+01 |
| 3 | 6.6206e+01 | 4.9779e+01 |
| 4 | 1.4187e+02 | 1.0667e+02 |
| 5 | 2.9320e+02 | 2.2045e+02 |
| 6 | 5.9585e+02 | 4.4801e+02 |
| 7 | 1.2012e+03 | 9.0313e+02 |
| 8 | 2.4118e+03 | 1.8134e+03 |
| 9 | 4.8330e+03 | 3.6339e+03 |
| 10 | 9.6755e+03 | 7.2748e+03 |
| 11 | 1.9361e+04 | 1.4557e+04 |
| 12 | 3.8730e+04 | 2.9121e+04 |
| 13 | 7.7470e+04 | 5.8248e+04 |
| 14 | 1.5495e+05 | 1.1650e+05 |
| 15 | 3.0991e+05 | 2.3302e+05 |

$(P_e/2) = 10^{-8}$

| BITS | SNRvec | SNRmaxvec |
|---|---|---|
| 1 | 1.0947e+01 | 8.2309e+00 |
| 2 | 3.2841e+01 | 2.4693e+01 |
| 3 | 7.6630e+01 | 5.7616e+01 |
| 4 | 1.6421e+02 | 1.2346e+02 |
| 5 | 3.3936e+02 | 2.5516e+02 |
| 6 | 6.8967e+02 | 5.1855e+02 |
| 7 | 1.3903e+03 | 1.0453e+03 |
| 8 | 2.7915e+03 | 2.0989e+03 |
| 9 | 5.5940e+03 | 4.2060e+03 |
| 10 | 1.1199e+04 | 8.4204e+03 |
| 11 | 2.2409e+04 | 1.6849e+04 |
| 12 | 4.4828e+04 | 3.3705e+04 |
| 13 | 8.9668e+04 | 6.7419e+04 |
| 14 | 1.7935e+05 | 1.3485e+05 |
| 15 | 3.5870e+05 | 2.6970e+05 |

Fig. 5

METHOD AND APPARATUS FOR DISCRETE MULTITONE COMMUNICATION BIT ALLOCATION

BACKGROUND OF THE INVENTION

The present invention relates to data communications, specifically to an apparatus and method for allocating bits among carrier tone subchannels (bins) in a discrete multitone modulation (DMT) communication system. The present invention allows DMT communication to proceed at a data rate via communication equipment which is less complicated, less costly, and more efficient than prior DMT communication devices.

Data transmission modulation schemes are broken into many categories, the two major of which are single carrier modulation and multicarrier modulation. Single carrier modulation employs the use of a single frequency upon which data is modulated. For example, a single carrier modem might use a 2 KHz carrier and quadrature amplitude modulation (QAM) or phase shift keying (PSK) modulation to "superimpose" the data on the carrier. Although used in many applications and environments, single carrier modulation modems, such as V.34 modems, are often used on voiceband systems such as POTS lines (plain old telephone system). Further, bit allocation among carrier tones is not an issue in single carrier modulation systems since only one carrier tone is used. As such, the invention is not directed to single carrier systems.

The other category of modulation transmission techniques is multicarrier modulation. In multicarrier modulation communications, the transmission channel is partitioned into a number of narrowband subchannels. These narrowband transmission subchannels typically correspond to a series of contiguous frequency bands in which each subchannel uses a distinct carrier frequency. This distinct carrier frequency is also referred to as a "tone", and the subchannel is referred to as a "bin". The capacity of the entire transmission channel is the sum of the capacities of each individual subchannel. The method for assigning data information and energy to each of the subchannels in a multichannel transmission environment is called "loading". The distribution of data information among the channels is referred to as "bit allocation".

Multicarrier modulation techniques for data communication are not new, and have been known and used for the past 50 years. However, prior to the proliferation of digital communication technologies and efficient methods for digital signal processing, multicarrier modulated communication systems often relied on a group of modems with differing carrier frequencies whose signals were added together to form a composite signal. As shown in FIG. 1, a data stream would enter a serial to parallel signal splitter 2 whose output would feed a plurality of modems 4. The modems would each be set to modulate at a different carrier frequency. The analog output of each modem would be added together and transmitted along the communication channel 8. The composite signal would be separated and demodulated at the receiving end via a complementary set of equipment.

This technique required multiple modems, was not reliable and did not take into account the different operating and performance characteristics of each individual carrier frequency. This resulted in an inefficient use of the communication channel resources. For example, in a typical communication environment, signals with higher frequencies attenuate quicker and are more subject to noise than signals at low frequencies. Thus, it was possible that a subchannel with a high signal-to-noise ratio could be under utilized, while a subchannel with a low signal-to-noise ratio could be over utilized resulting in an unnecessary degradation in overall transmission channel performance.

Subsequent DMT multicarrier modulation equipment made use of digital signal processing techniques including Fast Fourier Transforms and Inverse Fast Fourier Transforms. Digital signal processing allowed a single DMT communication device to be used to modulate all subchannels, thereby improving reliability and lowering the cost of communications. These devices, however, were still constrained by the limitations of their predecessors, namely, inefficient use of the communication channel resources.

A preferred approach is to load each subchannel based on the individual transmission characteristics of that subchannel. Better subchannels, should carry more information than poorer quality subchannels. This allows an efficient use of the communication channel resources.

Transmission channels are typically characterized by the channel's margin, signal-to-noise ratio gap (hereinafter SNR gap), and capacity. All are related concepts. The margin is the amount of additional signal-to-noise ratio in excess of the minimum required to achieve a given performance level for a particular type of modulation scheme with a particular SNR gap. The SNR gap is a function of a chosen probability of transmission error and the modulation and coding techniques. The SNR gap measures the inefficiency of the transmission method with respect to the best possible performance, assuming an additive white Gaussian noise channel. The SNR gap is often constant over a wide range of transmission rates which may be transmitted by the particular modulation coding technique. The channel capacity refers to the maximum data rate capable of being transmitted on a particular channel. The optimum line coding technique has a SNR gap of zero dB. Although such an optimum line code requires infinite decoding/encoding delay and is infinitely complex, it has become practical at typical Digital Subscriber Line (DSL) speeds to implement modulation methods to achieve SNR gaps as low as 1–2 dB. Therefore, one factor to be considered during the bit allocation process is the transmission quality of each subchannel, in order to maximize the bit allocation for each subchannel.

Another factor to be considered during the bit allocation process is gain scaling. Gain scaling allows an individual subchannel to be amplified or attenuated based on a set of parameters. Certain DSL technologies and standards such as the Asymmetric Digital Subscriber Line (ADSL) T1.413 standard specify a scaling range, such as ±2.5 dB, subject to a maximum total energy level for the entire channel. However, these standards do not specify how to implement the gain scaling factor.

Bit allocation in a discrete multitone transmission environment is a well-studied problem, relating to the development of a number of different bit allocation algorithms. Optimum bit allocation can be achieved using the well-known "water-filling" algorithm. However, there are two major drawbacks with "water-filling". First, the resulting calculated bit distribution is not necessarily a set of integers. This may result in complications during implementation. Second, the "water-filling" algorithm maximizes the aggregate bit rate for a given margin and bit error rate. However, maximizing the margin at a given bit error rate and a given bit rate is desirable in many applications.

The loading goal of bit-loading is generally classified as either rate-adaptive loading or margin-adaptive loading. In rate-adaptive loading, the data rate is maximized subject to the constraint of fixed total power. In margin-adaptive loading, the goal is to maximize the margin at a fixed data rate.

There are at least two popular strategies employed to try to achieve these goals. The first, Chow's algorithms, suggests an on/off energy distribution, and only approximately solve the problems associated with achieving the rate-adaptive and margin-adaptive loading goals. The second category is Greedy algorithms. This well-known class of algorithms can solve the loading problems exactly. For example, the Hughes-Hartog and Campello algorithms belong to the family of Greedy algorithms. Greedy algorithms work to allocate bits to the subchannels in an incremental way such that a subchannel is always chosen for the next bit to be allocated according to the least cost in energy. In other words, the best subchannel gets the first bit, and a table of incremental next energies for the next bit must be computed and the process continued until all bits have been allocated in the case of margin-adaptive loading, and until there is no more energy available in the case of rate-adaptive loading.

Although these algorithms can solve the bit-loading problem, there are a number of significant drawbacks associated with their implementation. First, the computational load required to implement these algorithms can be very large. This can significantly drive up the cost of implementation in modem hardware, due to computational complexity. The computational load in the prior art algorithms typically arises because (1) the algorithms require global operations such as sorting, finding maximum or minimum values of a set of numbers, finding geometric means, etc. over all subchannels; (2) the algorithms require iterative processing; and (3) the algorithms may require that logarithmic operations be performed. Regarding (1), because the number of subchannels can be quite large (over 100 in many cases), performing global operations can result in hefty processing and storage requirements.

In addition, the water-filling, Chow's and Greedy algorithms do not take gain scaling into account as part of their bit-loading calculations. However, gain scaling must be done in order to have the same bit error rate with an integer number of bits as opposed to a result which provides the same bit error rate but a non-integer number of bits. In other words, gain scaling is required in order to round the resultant bit allocation for a subchannel to the next highest or lowest integer value when that number is calculated to achieve a particular bit error rate.

The relation between the number of bits b in a subchannel i and the signal-to-noise ratio (SNR) in that subchannel is:

$$b_i = \log_2\left(1 + \frac{SNR_i}{\gamma}\right) \quad \text{(Equation 1)}$$

where $\gamma$ is the SNR gap. The detail behind the derivation of this equation is described below. Recall that the SNR gap depends on the type of modulation and coding used in a transmitter as well as the target bit error rate (BER). This same expression can be rewritten in order to express the SNR required to achieve a particular number of bits per subchannel. Because this expression must hold after bit allocation has been completed, gain scaling should be done at the transmitter to ensure that the received SNR in the i subchannel corresponds to $b_i$ bits in that subchannel. In addition, certain transmission standards, such as the ADSL standards, specify a spectrum mask for the transmitted signal which specifies the minimum and maximum amount of gain scaling allowed in a given bin. Adding the constraint of limiting gain scaling to the above algorithms requires that they be modified further, thereby further increasing the complexity of calculations and modem hardware requirements. The prior art algorithms also do not support a bit allocation method which allows different subchannels to operate at different bit error rates or margins.

It is desirable to use a bit allocation method and apparatus which accurately determine bit allocations for a large number of subchannels, and which takes into account gain scaling and a gain scaling cap.

It is also desirable to have a bit allocation method which does not require that the transmission hardware and software perform any sorting or complex mathematical operations. It is further desirable to have a method which can allocate bits to subchannels based on a desired bit error rate, and further to be able to allow subchannels to operate at different bit error rates.

SUMMARY OF THE INVENTION

An object of the invention is to provide a method of allocating bits to a plurality of transmission subchannels in a communication system in which a storing step stores at least one bits to signal-to-noise ratio table in a memory. A determining step determines a bit allocation value and a gain scaling factor for each of the plurality of transmission subchannels in accordance with the at least one stored bits to signal-to-noise ratio table.

In accordance with this method, the stored table is comprised of a plurality of minimum signal-to-noise ratio values and a corresponding plurality of respective bit values, the minimum signal-to-noise ratio values being determined in accordance with a maximum allowable gain scaling factor, wherein the signal-to-noise ratio values also correspond to the plurality of respective bit values.

It is another object of the present invention to provide a method of allocating bits to a plurality of transmission subchannels in a communication system, in which a measuring step measures a signal-to-noise ratio for each of the plurality of transmission subchannels. An adjusting step adjusts the measured signal-to-noise ratio in accordance with an SNR-margin and a coding gain. A generating step generates a plurality of signal-to-noise ratio difference values. A selection step selects a bit allocation value for each of the plurality of transmission subchannels, the bit allocation value corresponding to one of the plurality of signal-to-noise ratio difference values. A determining step determines a gain scaling factor for each of the plurality of transmission subchannels, and a storing step stores each of the bit allocation values and the gain scaling factors in one or more data structures.

It is yet another object of the present invention to provide a data communication apparatus for allocating bits to a plurality of transmission subchannels in a communication system, in which there is a memory for storing at least one bits to signal-to-noise ratio table. A processing unit determines a bit allocation value and a gain scaling factor for each of the plurality of transmission subchannels in accordance with the at least one stored bits to signal-to-noise ratio table.

Another object of the present invention is to provide a data communication apparatus for allocating bits to a plurality of transmission subchannels in a communication system, in which there is a memory and a processing unit.

The processing unit controls functions which measure a signal-to-noise ratio for each of the plurality of transmission subchannels, adjust the measured signal-to-noise ratio in accordance with an SNR-margin and a coding gain, generate a plurality of signal-to-noise ratio difference values, select a bit allocation value for each of the plurality of transmission subchannels, the bit allocation value corresponding to one of the plurality of signal-to-noise ratio difference values, determine a gain scaling factor for each of the plurality of transmission subchannels, and store each of the bit allocation values and the gain scaling factors as one or more data structures in the memory.

Other features and advantages of the present invention will become apparent from the following description of the invention which refers to the accompanying drawings.

BRIEF DESCRIPTION OF THE DRAWING(S)

For the purpose of illustrating the invention, there is shown in the drawings a form which is presently preferred, it being understood, however, that the invention is not limited to the precise arrangement and instrumentality shown.

FIG. 1. is a block diagram showing a prior art multicarrier communication system.

FIG. 5 is two tables showing examples of an arrangement of the $SNR_{vec}$ and $SNR_{maxvec}$ vectors.

DETAILED DESCRIPTION OF THE INVENTION

Initially, it should be noted that the following description refers to both bit error rate (BER) and symbol error rate per dimension ($P_e/2$). The bit error rate is a function of the symbol error rate per dimension for a particular type of line coding. For example, a $P_e/2$ of $10^{-7}$ corresponds to different BERs depending on the type of line coding used. For the sake of simplicity and ease of understanding, the terms BER and $P_e/2$ are used interchangeably herein.

In a typical data communication environment, communications on a DSL is typically broken into two distinct time periods. The first is the commencement of communications in which the communication hardware devices determine, among other things, line quality, channel estimation, and various equalization parameters. This period of time is called the training period, and also includes determining how to allocate bits among the subchannels. Once the training sequence is complete, the communication hardware shifts into the "showtime" period in which actual data communications occur. Of course, even during this showtime period, the communication hardware can continue to monitor the line quality and adjust communication parameters as necessary.

The complexity of the training sequence requires that the implementation of the various aspects of that sequence occur as efficiently as possible.

Figure 1:
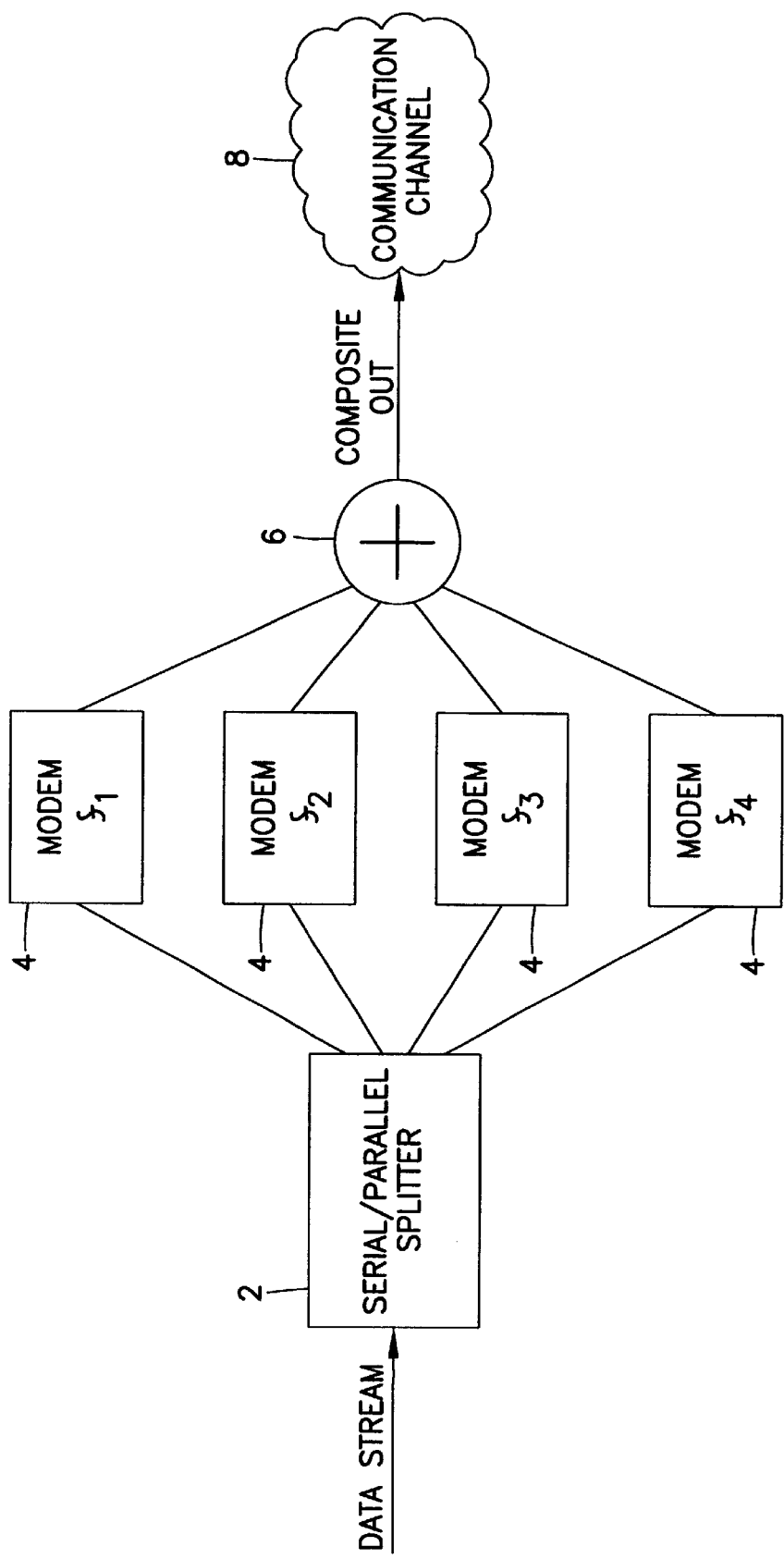
Figure 2:
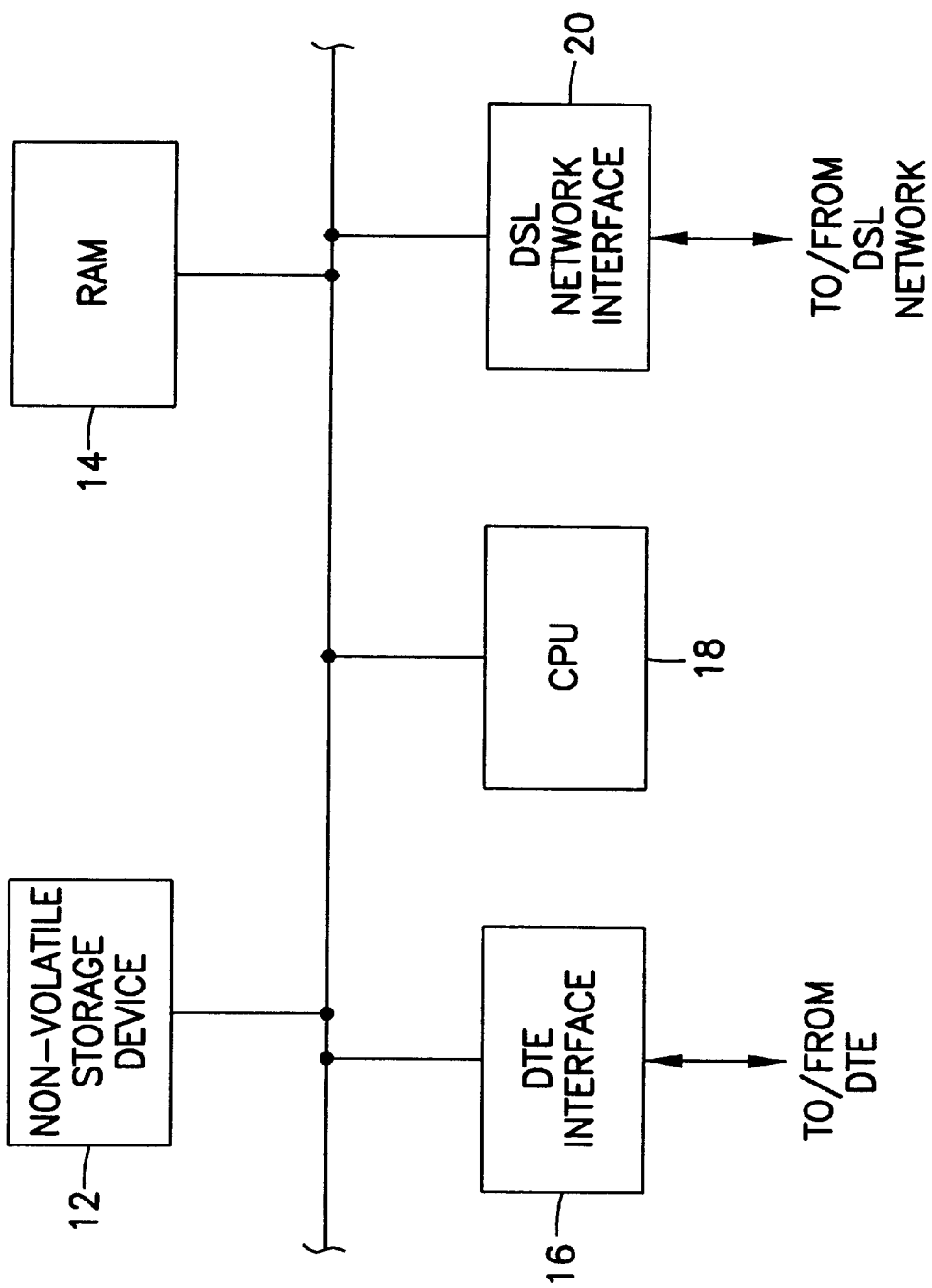
FIG. 2 is a block diagram showing the hardware components of a communication device of the present invention.

The method for allocating bits among subchannels can be broken into two main sub-components. First is the creation and storage of one or more tables corresponding to the number of bits which can be placed in a subchannel to achieve a desired $P_e/2$ rate given a set of minimum and maximum allowable gains. These tables can be computed prior to communication hardware assembly. FIG. 2 shows the configuration of a DSL communication device. A communication device 10 is comprised of at least a storage device 12, a random access memory (RAM) 14, a data terminal equipment (DTE) interface 16, a central processing unit (CPU) 18, and a DSL network interface 20, all connected via an internal bus structure within communication device 10. Data terminal equipment interface 16 and DSL network interface 20 are used to send and receive data to and from data terminal equipment and a DSL network, respectively. Random access memory 14 is used, among other things, to store communications data, communication device operating programs, and measured parameters taken during the training and "showtime" stages, including, for example, the measured signal-to-noise ratios for each subchannel. Storage device 12 is a non-volatile memory such as a read-only memory (ROM) or erasable programmable read-only memory (EPROM), or the like, which can store operational programs and look-up table data. CPU 18 is used to control functions of communication device 10. CPU 18 can also be used to calculate look-up table data and store that data in RAM 14 or storage device 12. Alternatively, look-up table data can be pre-computed at a factory and stored in non-volatile storage device 12 prior to, during, or after the assembly of the communication device 10. For example, the communication device 10 can be updated in the field by downloading a new table or set of tables via the DSL 20 or DTE 16 interfaces, or via a craft communication port (not shown).

Figures 3, 7:
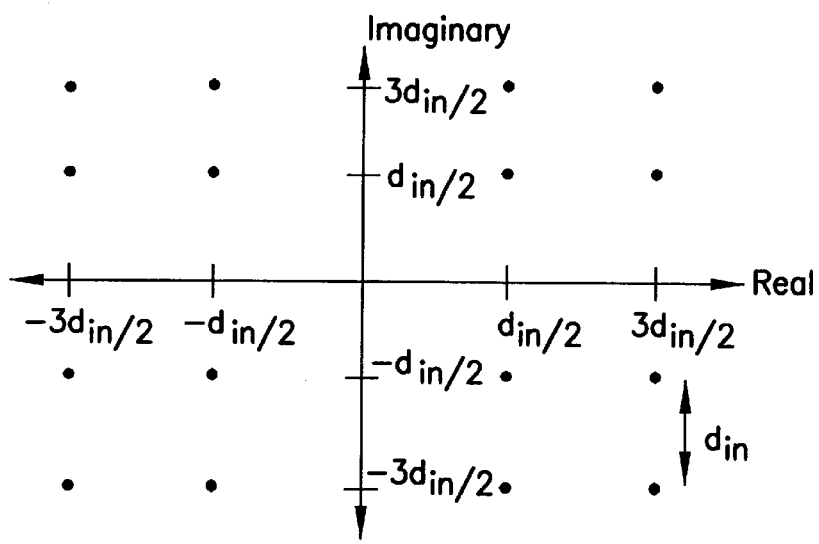
FIG. 3 is a diagram of a Quadrature Amplitude Modulation-16 coding constellation.
FIG. 7 is a table showing an example of an $SNR_{diff}$ table.

The pre-computed look-up tables are prepared using the following method. FIG. 3 shows a typical square 16-QAM constellation with a minimum distance $d_{in}$ in which $d_{in}$ is the minimum distance between constellation points at the input to the communication channel. The energy $E_i$ of this constellation is defined as:

$$E_i = \frac{2^i - 1}{6} d_{in}^2 \qquad \text{(Equation 2)}$$

Given $E_i$ and $d_{in}$, the number of bits that can be allotted to a subchannel is defined as:

$$i = \log_2\left(1 + 6\frac{E_i}{d_{in}^2}\right) \qquad \text{(Equation 3)}$$

At the receiver, the minimum distance $d_{out}$ between constellation points at the receiver is defined as:

$$d_{out}^2 = d_{in}^2 |H|^2 \qquad \text{(Equation 4)}$$

where H denotes the frequency-domain complex channel attenuation for a given bin. Using Equation 4 in Equation 3:

$$i = \log_2\left(1 + \frac{6E_i|H|^2}{d_{out}^2}\right) \qquad \text{(Equation 5)}$$

The signal-to-noise-ratio (SNR) at the receiver is defined as:

$$SNR_i = \frac{E_i|H|^2}{2\sigma^2} \quad \text{(Equation 6)}$$

where $\sigma^2$ denotes the variance of the additive noise per dimension (for two-dimensional QAM). Also, the "SNR gap" $\gamma$ is defined as:

$$\gamma = \frac{d_{out}^2}{12\sigma^2} = \frac{1}{3}\left(\frac{d_{out}}{2\sigma}\right)^2 \quad \text{(Equation 7)}$$

By substituting Equations 6 and 7 into Equation 5, earlier mentioned Equation 1 is derived as:

$$b_i = \log_2\left(1 + \frac{SNR_i}{\gamma}\right) \quad \text{(Equation 1)}$$

Given the SNR in a particular bin and the SNR gap, the number of bits b that can be reliably transmitted in that bin is given by Equation 1 above. Since the theoretical channel capacity is given by $C=\log_2(1+SNR)$, $\gamma$ represents the channel loss with respect to capacity. In other words, Equation 1 gives the capacity of the bin with SNR reduced by $\gamma$ dB. Thus, $\gamma$ is called the SNR gap.

In certain communication standards, such as ADSL, the probability of symbol error per dimension ($P_e/2$) is typically specified to be $10^{-7}$. It could, however, be other values such as $10^{-6}$ or $10^{-8}$. $P_e$ for QAM constellation is defined as:
where the Q-function is defined as:

$$P_e \approx 4Q\left(\frac{d_{out}}{2\sigma}\right) \quad \text{(Equation 8)}$$

$$Q(x) = \int_x^\infty \frac{1}{\sqrt{2\pi}} \exp\left(-\frac{y^2}{2}\right) dy \quad \text{(Equation 9)}$$

For example, setting $P_e/2=10^{-7}$, using the inverse Q-function described in Equation 8 above, and substituting these values into Equation 7, yields $\gamma=9.8$ dB. This is a well known value in single and multi-carrier data transmission.

This SNR gap can be reduced by the use of coding. For example, many error correction techniques can provide a coding gain ($\gamma_{coding}$) of 3 dB to 5 dB. On the other hand, the SNR gap is increased by an SNR margin factor SNR-margin ($\gamma_{margin}$). The need for an SNR margin factor is motivated by the presence of unforeseen additive noise impairments. It represents the additional noise power in dB that would be required to increase the $P_e/2$ rate to the specified value, for example, $10^{-7}$. For example, typical specified values for SNR-margin in ADSL systems are 4 dB or 6 dB. Thus, the effective SNR gap is defined as ($\gamma+\gamma_{margin}-\gamma_{coding}$). For a given margin and coding gain, a bit-loading algorithm can re-compute the SNR gap appropriately as above. Alternately, the measured SNR in each bin can be reduced by $\gamma_{margin}-\gamma_{coding}$) dB and $\gamma$ can be left unchanged.

Figure 4:
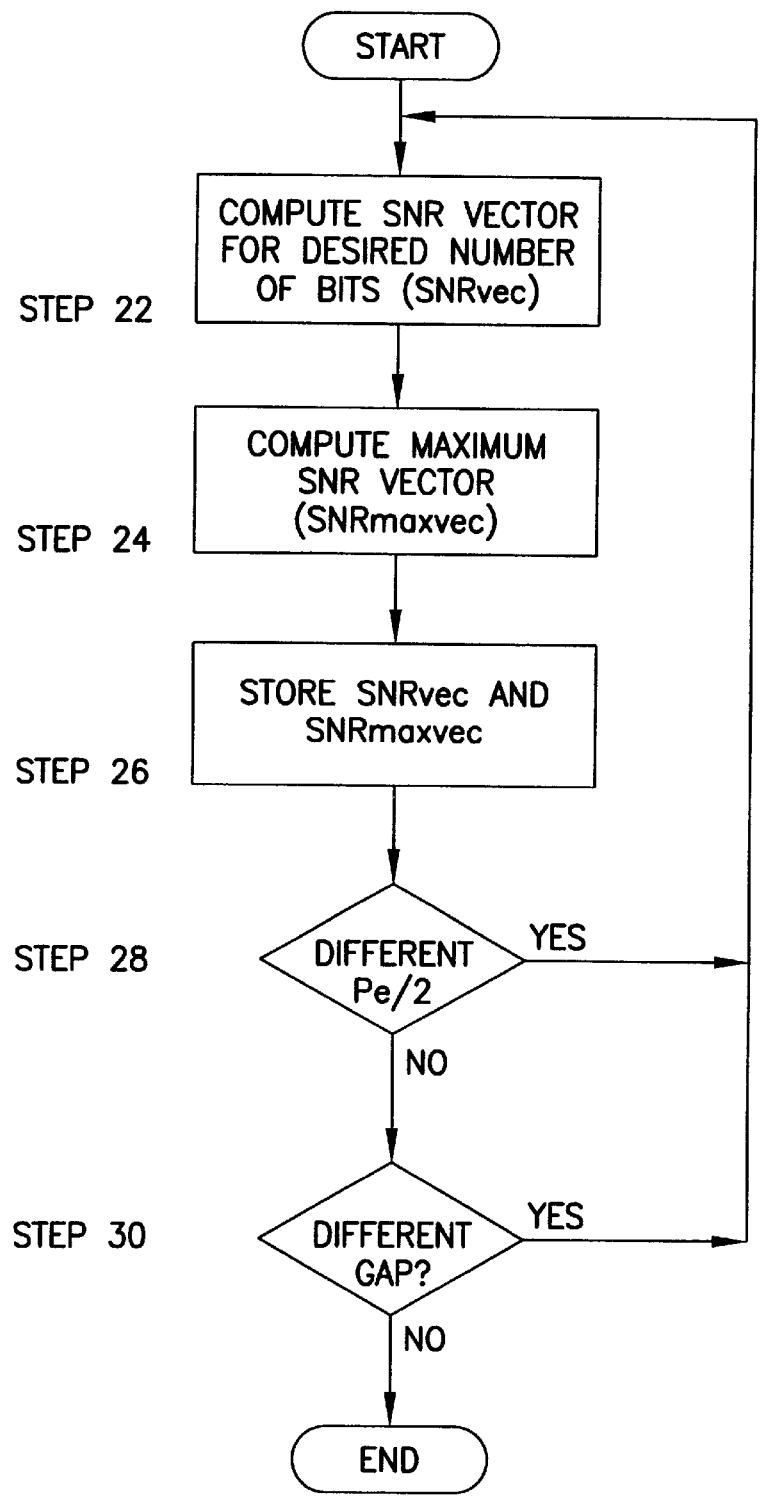
FIG. 4 is a flow chart showing the process for preparing the pre-computed look-up tables of the present invention.

The implementation of the above derivations as used in this invention will now be described. Referring to FIG. 4, a vector of SNRs called $SNR_{vec}=[SNR_{ibit} \ldots SNR_{pbit}]$ is computed, where $SNR_{ibit}$ is the SNR required in a subchannel to have i number of bits in that subchannel, and p is the maximum number of bits that can be allocated to a subchannel (step 22).

For a given error-rate requirement and SNR gap, Equation 1 can be used to compute the SNR required to place i bits in a bin. The resulting equation is defined as:

$$SNR_i=\gamma(2^i-1) \quad \text{(Equation 10)}$$

Of course, $\gamma_{margin}$ and $\gamma_{coding}$ can be included into $\gamma$ above. In the proposed bit-loading technique, and as shown in FIG. 5, a table of $SNR_i$, denoted by $SNR_{vec}=[SNR_1, SNR_2, \ldots, SNR_P]$, is first computed for a range of i=1 to i=P, for example, P=15. By way of example, two tables are shown in FIG. 5, one showing $SNR_{vec}$ for a $P_e/2$ of $10^{-7}$, and another showing $SNR_{vec}$ for a $P_e/2$ of $10^{-8}$.

Certain communication standards specify a maximum allowable gain scaling factor $G_{max}$. The vector $SNR_{vec}$ is then divided by this maximum gain scaling factor to get another table named $SNR_{maxvec}$ (step 24). In other words, $SNR_{maxvec}$ is defined as:

$$SNR_{maxvec}=SNR_{vec}/G_{max} \quad \text{(Equation 11)}$$

For example, in the ANSI T1.413 ADSL standard $G_{min}=0.75$ and $G_{max}=1.33$ (±2.5 dB). $SNR_{maxvec}$ tables for $P_e/2$ of $10^{-7}$ and $10^{-8}$ with the $SNR_{maxvec}$ columns scaled by 1.33 are shown in FIG. 5. For example, the $SNR_{maxvec}$ value for $P_e/2$ of $10^{-7}$ and a bit allocation of 5 bits corresponds to 2.9320e+02 divided by 1.33, equalling 2.2045e+02. As a comparison, the same bit allocation of 5 bits yields an $SNR_{maxvec}$ value for $P_e/2$ of $10^{-8}$ of 2.5516e+02.

The vector $SNR_{vec}$ contains the minimum possible measured SNR at the receiver for each bin for which a given number of bits can be allotted by utilizing the maximum allowed gain scaling factor.

$SNR_{vec}$ and $SNR_{maxvec}$ are computed and stored as a table and used as an integral part of the bit allocation process (step 26). $\gamma_{margin}$ and $\gamma_{coding}$ are not included in this calculation and are absorbed in the measured SNR as described above. $SNR_{vec}$ and $SNR_{maxvec}$ can also be stored as separate tables.

Once an $SNR_{vec}$ and $SNR_{maxvec}$ table has been stored for a particular number of bits, the process can be repeated to create a table for a different BER (step 28). Similarly, the process can be repeated to create a set of tables for a different SNR gap for a different line coding technique (step 30). Different subchannels therefore, can each have bit allocation values calculated based on different margins, different $P_e/2$ error rates, and different coding gains, subject to the quantity of tables stored in the communication device 10.

Once the $SNR_{vec}$ and $SNR_{maxvec}$ table(s) have been computed and stored in non-volatile storage device 12 or RAM 14 as described above, the second main subcomponent of the invention is used to determine the actual subchannel bit allocation. This component is utilized during the communication device 10 training sequence.

Figure 6:
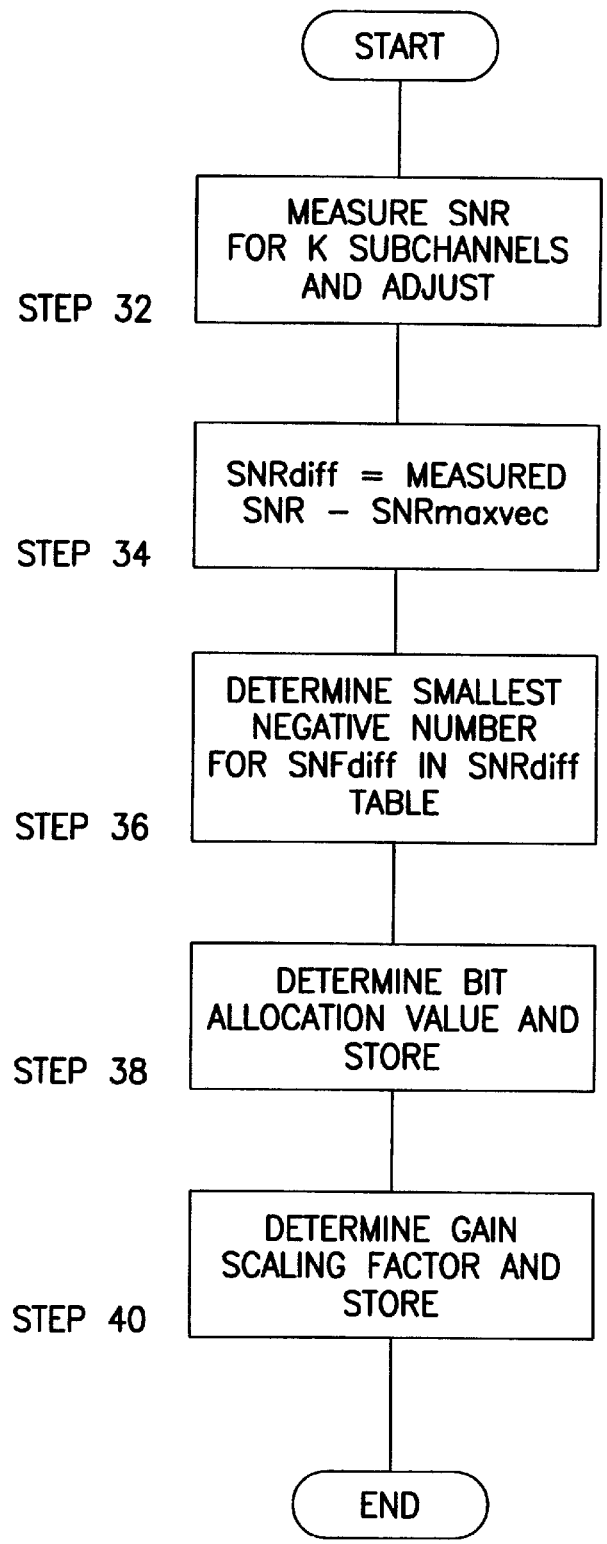
FIG. 6 is a flow chart showing the bit allocation process of the present invention.

Referring to FIG. 6, the bit allocation process proceeds as follows. Although the process described below is described in terms of bit allocation for a single subchannel, this process can be performed either sequentially, in batches of subchannels, or in parallel for each of the subchannels in the communication channel.

The bit-loading process requires that the measured SNR be obtained for each bin (kth element denoted by $SNR_{meas,k}$ (step 32). Although it is preferred that the SNR for all subchannels be measured prior to completing the bit allocation process, it is possible to complete the bit allocation process for a subchannel without measuring the SNR for any other channels once the SNR has been measured for that subchannel. Techniques for measuring the SNR of a group of communication subchannels are known to those of ordinary skill in the art.

This measured SNR vector is then adjusted for SNR-margin and coding gain. The adjustment for SNR-margin and coding gain is made by subtracting the decibel (dB)

value of the SNR-margin from, and adding the decibel value of the coding gain to, the decibel value of the measured SNR vector. For example, if the measured value is 10 dB, the SNR-margin 6 dB, and the coding gain 3 dB, the adjusted measured SNR vector is 10 dB−6 dB+3 dB=7 dB.

In particular, it is advantageous to complete the bit allocation process in parallel or in batches in order to speed up the training process. The degree of parallelism is a function of the designer's hardware and storage choices.

Once the adjusted measured SNR has been determined for the desired subchannel, an SNR differential, designated $SNR_{diff}$ is determined for that subchannel (step 34). The $SNR_{diff}$ for a particular number of bits is determined by subtracting the adjusted measured SNR ($SNR_{meas}$) for that subchannel from the corresponding element of the $SNR_{maxvec}$ table. The $SNR_{diff}$ calculation is repeated for the remaining elements, i.e., bit amounts, of the $SNR_{maxvec}$ table. Thus, the calculation of $SNR_{diff}$ relies on a simple table look-up and subtraction operation.

An alternative method for obtaining $SNR_{diff}$ is to multiply $SNR_{meas}$ by $G_{max}$ and compare with $SNR_{vec}$. At the expense of a multiplication operation for each element of $SNR_{meas}$, the vector $SNR_{maxvec}$ need not be precomputed and stored since it is not required in this alternative computation method.

As shown in FIG. 7, the determination of $SNR_{diff}$ is itself a table whose elements represent the difference between the measured SNR and $SNR_{maxvec}$. FIG. 7 shows an example $SNR_{diff}$ table for $P_e/2$ of $10^{-7}$ where the measured SNR is 250.

A mathematical operation is performed on the $SNR_{diff}$ table to determine the smallest negative entry, i.e., the entry corresponding to the negative entry closest to zero, in the $SNR_{diff}$ table (step 36). If all the entries of $SNR_{diff}$ are positive, the measured SNR is smaller than the minimum SNR required to carry any number of bits. In this case the particular bin cannot carry any bits with the specified requirements and is allotted 0 bits. If some or all elements are negative, the index of the negative element with the smallest magnitude (the negative element closest to zero in magnitude) of $SNR_{diff}$ is the number of bits that can be carried in the bin.

Note that only the sign of the elements of $SNR_{diff}$ is important, not their magnitude. As such, the magnitude of the $SNR_{diff}$ values can be discarded. The operation can be implemented in software or hardware because, inter alia, as stated above, all that is required to determine the smallest negative entry in the $SNR_{diff}$ table is to find the index point in the $SNR_{diff}$ table corresponding to the first sign change in the $SNR_{diff}$ column when reading the table from top (lowest bit allocation) to bottom (highest bit allocation). The negative entry of $SNR_{diff}$ with the smallest magnitude (the index of the first sign change in $SNR_{diff}$) gives the number of bits allocated for that subchannel (step 38). No complex mathematical calculations, sorting operations or other CPU intensive activity is required, and the communication device storage capacity need not be sized to store voluminous amounts of data such as might be required if using prior art bit allocation methods. Referring to FIG. 7, the bit allocation for $P_e/2$ of $10^{-7}$ for the example subchannel would be 5.

The bit allocation value is then stored for later transmission to the partner communication device. This bit allocation value can be sent, for example, as a table or other data structure to the partner communication device during the training sequence in order to instruct the partner communication device how to load each subchannel.

Gain scaling is then determined for that subchannel (step 40). The gain scaling factor is determined as follows. Denoting the adjusted measured SNR in the kth bin by $SNR_{meas,k}$ and the number of allotted bits in bin by p, the gain scaling factor for the kth bin ($gain_k$) is defined as:

$$gain_k = \frac{SNR_p}{SNR_{meas,k}} \qquad \text{(Equation 12)}$$

$SNR_p$ refers to the value of $SNR_{vec}$ at the allotted bit quantity. Note that elements of all vectors, such as $SNR_{vec}$, $SNR_{maxvec}$, $SNR_{meas}$, etc., are on a linear scale and not on a logarithmic or decibel scale. This greatly reduces the need for a sophisticated and powerful CPU. Because of the derivation method used, the $gain_k$ in Equation 12 cannot exceed $G_{max}$. On the other hand, if the gain turns out to be smaller than $G_{min}$, the gain scaling factor is set to $G_{min}$. This yields a better $P_e/2$ rate for that subchannel. Of course, the bit allocation data structure can be completed for all subchannels prior to gain scaling factor determination.

For example, with reference to FIG. 7, for $P_e/2=10^{-7}$, assume the measured SNR for a particular bin after adjusting for SNR-margin and coding gain, if any, is 250 (23.98 dB) as used above. Recall that an SNR of 250 is sufficient for allotting at most 5 bits, since the 5th element of $SNR_{diff}$ is negative and 6th element is positive. The gain scaling factor for this bin is computed as (2.9320e+02/250)=1.17.

The gain scaling factor is then stored for later transmission to the communication partner. Once gain scaling factors have been determined, the table or data structure containing these factors is transmitted to the communication partner along with the bit allocation forwarding table. Methods of transmitting tabular data between multiple communication devices are well known in the art, and descriptions of the particular format of each table, or of a composite bit allocation/gain scaling data structure are not relevant to the invention and are omitted.

Also, because multiple tables corresponding to different $P_e/2$ values can be predetermined and stored, it is possible to allocate bits and establish gain scaling values for different subchannels using different $P_e/2$ values for those subchannels. For example, a $P_e/2$ value of $10^{-7}$ can be used to determine bit allocation and gain scaling for some subchannels, and a $P_e/2$ value of $10^{-8}$ can be used for the remaining subchannels. Of course, there is no limit to the number of different $P_e/2$ values which can be used, subject only the quantity of $SNR_{vec}$ tables stored in the communication device.

Although the figures and the above examples use integer values for the resultant bit allocation values for each bin, the bit allocation value granularity can be less than a single bit, i.e., half or quarter bit, as long as the sum of the bit allocation values for a group of subchannels is an integer. In other words, tables for $SNR_{vec}$ and $SNR_{maxvec}$ can be computed and stored in which the granularity for the bit allocation values is less than one, as long as the subsequent bit allocation determination process operates so as to result in an integer value for the total bit allocation for all channels. For example, the bit allocation determination for two subchannels can each be 1.5 bits since the total bit allocation value for these subchannels is 3 bits. Providing a bit allocation granularity of less than one can result in a more efficient gain scaling determination.

In a case where a fixed data communication rate is required, additional steps may be necessary once the bit allocation forwarding table has been completed. When the required fixed data rate is less than the data rate achievable using the previously described bit allocation process, bits can be removed systematically from the forwarding bit allocation table until the necessary bit rate is achieved. In other words, a fixed data rate can be achieved by decreasing the number of allocated bits for one or more of the of subchannels until the desired bit rate is reached. One possible method for accomplishing this bit allocation removal is to remove bits from the subchannel with the greatest bit allocation value. In the case of a tie, i.e., where more than one subchannel has the largest bit allocation value, the tie can be broken by selecting the subchannel with the largest gain scaling factor. This tie-breaking method enhances power saving while at the same time lowering the bit rate to the desired level. The process is repeated until the desired bit rate is achieved.

A possible outcome of the inventive method is that, like other resultant outcomes of other bit allocation techniques, the overall power in the transmitted bandwidth may be slightly higher than mandated by certain standards. Although the probability of this happening is extremely low, the problem can be easily addressed by making minor modifications to the bit allocation process. For example, the total energy after bit allocation can be calculated and stored during the bit allocation process. If the total energy exceeds the mandated limit, bits can be removed from some bins by using appropriate criteria in order to reduce the total energy to below the mandated limit. For example, the entire symbol can be attenuated by an appropriate factor to bring it below the mandated limit. While this will result in a slightly higher average BER, the performance-complexity trade-off may be acceptable in many situations.

Although the above description is directed to a bit allocation process in which all subchannels are analyzed and bits allocated, an alternative embodiment exists in which the bit allocation process is completed for a subset of subchannels, with the process not being completed for the remaining subchannels. For example, when the communication device has completed its training sequence and is operating in "showtime", line degradation might lower the signal-to-noise ratios for certain subchannels such that the bit allocation process might need to be executed, and the bit allocation forwarding table and the gain scaling table updated to reflect the new bit allocations for the selected subchannels. Further, bit allocations for a subset of subchannels might be warranted during the training sequence based on a particular set of requirements or communication equipment operating conditions.

The above described method and system provide a bit-loading process which is readily implementable in hardware and software, does not involve any sorting operations or complex mathematical operations, and can easily support multiple look-up tables corresponding to different $P_e/2$ rates and SNR margins. Within this inventive system and method, a framework is provided which also supports the use of different $P_e/2$ rates and SNR margins for different subchannels in a communication line, and a process for allocating bits and gain scaling less than the entirety of subchannels.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of allocating bits to a plurality of transmission subchannels in a communication system, the method comprising the steps of:
   storing at least one bits to signal-to-noise ratio table in a memory;
   determining a bit allocation value and a gain scaling factor for each of said plurality of transmission subchannels in accordance with said at least one stored bits to signal-to-noise ratio table.

2. A method according to claim 1, wherein said stored table is comprised of a plurality of minimum signal-to-noise ratio values and a corresponding plurality of respective bit values, said minimum signal-to-noise ratio values being determined in accordance with a maximum allowable gain scaling factor, wherein said signal-to-noise ratio values also correspond to said plurality of respective bit values.

3. A method according to claim 1, wherein said table is stored in a non-volatile storage device.

4. A method according to claim 1, wherein said table is stored in a random access memory.

5. A method of allocating bits to a plurality of transmission subchannels in a communication system, the method comprising the steps of:
   storing at least one bits to signal-to-noise ratio table in a memory;
   determining a bit allocation value and a gain scaling factor for each of said plurality of transmission subchannels in accordance with said at least one stored bits to signal-to-noise ratio table;
   wherein one of said bit allocation value determined for one of said plurality of subchannels differs from said bit allocation value determined for at least one of said remaining subchannels.

6. A method of allocating bits to a plurality of transmission subchannels in a communication system, the method comprising the steps of:
   storing at least one bits to signal-to-noise ratio table in a memory;
   determining a bit allocation value and a gain scaling factor for each of said plurality of transmission subchannels in accordance with said at least one stored bits to signal-to-noise ratio table;
   wherein said bit allocation value determined for at least one of said plurality of subchannels is determined in accordance with one of said stored tables, and said bit allocation value for at least one other of said plurality of subchannels is determined in accordance with another of said stored tables.

7. A method of allocating bits to a plurality of transmission subchannels in a communication system, the method comprising the steps of:
   storing at least one bits to signal-to-noise ratio table in a memory;
   determining a bit allocation value and a gain scaling factor for each of said plurality of transmission subchannels in accordance with said at least one stored bits to signal-to-noise ratio table;
   wherein said bit allocation values are determined in batches, each said batch being comprised of a predetermined quantity of said plurality of subchannels.

8. A method of allocating bits to a plurality of transmission subchannels in a communication system, the method comprising the steps of:
   storing at least one bits to signal-to-noise ratio table in a memory;
   determining a bit allocation value and a gain scaling factor for each of said plurality of transmission subchannels in accordance with said at least one stored bits to signal-to-noise ratio table;
   wherein said bit allocation values are determined simultaneously for all of said plurality of subchannels.

9. A method according to claim 1, wherein said stored table is comprised of a plurality of signal-to-noise ratio values and a corresponding plurality of respective bit values, and wherein said plurality of signal-to-noise ratio values are on a linear scale.

10. A method according to claim 1, wherein said bit allocation value is a non-integer.

11. A method according to claim 2, wherein said table is stored in a non-volatile storage device.

12. A method according to claim 2, wherein said table is stored in a random access memory.

13. A method according to claim 2, wherein one of said bit allocation values determined for one of said plurality of subchannels differs from said bit allocation value determined for at least one of said remaining subchannels.

14. A method according to claim 2, wherein said bit allocation value determined for at least one of said plurality of subchannels is determined in accordance with one of said stored tables, and said bit allocation value for at least one other of said plurality of subchannels is determined in accordance with another of said stored tables.

15. A method according to claim 2, wherein said bit allocation values are determined in batches, each batch being comprised of a predetermined quantity of said plurality of subchannels.

16. A method according to claim 2, wherein said bit allocation values are determined simultaneously for all of said plurality of subchannels.

17. A method according to claim 2, wherein said plurality of minimum signal-to-noise ratio values are on a linear scale.

18. A method according to claim 2, wherein said bit allocation value is a non-integer.

19. A method according to claim 2, wherein each said stored table comprises two separate tables and is stored as a first table and a second table, said first table is comprised of said plurality of minimum signal-to-noise ratio values and said corresponding plurality of respective bit values, and said second table is comprised of said signal-to-noise ratio values and said corresponding plurality of respective bit values.

20. A method of allocating bits to a plurality of transmission subchannels in a communication system, the method comprising the steps of:

measuring a signal-to-noise ratio for each of said plurality of transmission subchannels;

adjusting said measured signal-to-noise ratio in accordance with an SNR-margin and a coding gain;

generating a plurality of signal-to-noise ratio difference values;

selecting a bit allocation value for each of said plurality of transmission subchannels, said bit allocation value corresponding to one of said plurality of signal-to-noise ratio difference values;

determining a gain scaling factor for each of said plurality of transmission subchannels; and storing each of said bit allocation values and said gain scaling factors in one or more data structures.

21. A method according to claim 20, wherein each of said plurality of signal-to-noise ratio difference values is a difference between said adjusted measured signal-to-noise ratio for one of said plurality of transmission subchannels and a respective member of a first plurality of predetermined signal-to-noise ratio values.

22. A method according to claim 21, wherein said first plurality of corresponding predetermined signal-to-noise ratio values is determined by multiplying each respective member of a second plurality of predetermined signal-to-noise ratio values by a maximum allowable gain scaling factor.

23. A method according to claim 20, wherein said bit allocation selection step comprises the steps of:

searching said plurality of signal-to-noise ratio difference values to determine which of said values corresponds to a negative signal-to-noise ratio difference value having a smallest magnitude among said plurality of signal-to-noise ratio difference values; and establishing said bit allocation value as an index value corresponding to said determined value.

24. A method according to claim 20, further comprising the step of transmitting said data structures to a partner communication device.

25. A method according to claim 20, wherein said plurality of signal-to-noise ratio difference values are on a linear scale.

26. A method according to claim 20, further comprising the step of determining a fixed data rate.

27. A method according to claim 26, wherein said fixed data rate is determined by decreasing a number of allocated bits for one or more of the plurality of subchannels until a bit rate corresponding to said fixed data rate is achieved.

28. A method according to claim 27, wherein said one or more subchannels are determined by selecting a one of said plurality of subchannels with the highest bits allocated, and in the case where more than one of said plurality of subchannels has the highest bits allocated selecting said one of said plurality of subchannels with the highest bits allocated and a largest gain scaling factor.

29. A method according to claim 20, wherein said bit allocation value is a non-integer.

30. A method according to claim 21, wherein said gain scaling factor is determined by dividing a signal-to-noise ratio corresponding said selected bit allocation value by said adjusted measured signal-to-noise ratio value.

31. A data communication apparatus for allocating bits to a plurality of transmission subchannels in a communication system, the data communication apparatus comprising:

a memory for storing at least one bits to signal-to-noise ratio table;

a processing unit for determining a bit allocation value and a gain scaling factor for each of said plurality of transmission subchannels in accordance with said at least one stored bits to signal-to-noise ratio table.

32. A data communication apparatus according to claim 31, wherein said bits to signal-to-noise ratio table is further comprised of a plurality of minimum signal-to-noise ratio values and a corresponding plurality of respective bit values, said minimum signal-to-noise ratio values being determined in accordance with a maximum allowable gain scaling factor, wherein said signal-to-noise ratio values also correspond to said plurality of respective bit values.

33. A data communication apparatus according to claim 31, wherein said memory is a non-volatile storage device.

34. A data communication apparatus according to claim 31, wherein said memory is a random access memory.

35. A data communication apparatus for allocating bits to a plurality of transmission subchannels in a communication system, the data communication apparatus comprising:

a memory for storing at least one bits to signal-to-noise ratio table;

a processing unit for determining a bit allocation value and a gain scaling factor for each of said plurality of transmission subchannels in accordance with said at least one stored bits to signal-to-noise ratio table;

wherein one of said bit allocation values determined for one of said plurality of subchannels differs from said bit allocation value determined for at least one of said remaining subchannels.

36. A data communication apparatus for allocating bits to a plurality of transmission subchannels in a communication system, the data communication apparatus comprising:

a memory for storing at least one bits to signal-to-noise ratio table;

a processing unit for determining a bit allocation value and a gain scaling factor for each of said plurality of transmission subchannels in accordance with said at least one stored bits to signal-to-noise ratio table;

wherein said bit allocation value determined for at least one of said plurality of subchannels is determined in accordance with one of said stored tables, and said bit allocation value for at least one other of said plurality of subchannels is determined in accordance with another of said stored tables.

37. A data communication apparatus for allocating bits to a plurality of transmission subchannels in a communication system, the data communication apparatus comprising:

a memory for storing at least one bits to signal-to-noise ratio table;

a processing unit for determining a bit allocation value and a gain scaling factor for each of said plurality of transmission subchannels in accordance with said at least one stored bits to signal-to-noise ratio table;

wherein said bit allocation values are determined in batches, each batch being comprised of a predetermined quantity of said plurality of subchannels.

38. A data communication apparatus for allocating bits to a plurality of transmission subchannels in a communication system, the data communication apparatus comprising:

a memory for storing at least one bits to signal-to-noise ratio table;

a processing unit for determining a bit allocation value and a gain scaling factor for each of said plurality of transmission subchannels in accordance with said at least one stored bits to signal-to-noise ratio table;

wherein said bit allocation values are determined simultaneously for all of said plurality of subchannels.

39. A data communication apparatus according to claim 31, wherein said stored table is comprised of a plurality of signal-to-noise ratio values and a corresponding plurality of respective bit values, and wherein said plurality of signal-to-noise ratio values are on a linear scale.

40. A data communication apparatus according to claim 31, wherein said bit allocation value is a non-integer.

41. A data communication apparatus according to claim 32, wherein said memory is a non-volatile storage device.

42. A data communication apparatus according to claim 32, wherein said memory is a random access memory.

43. A data communication apparatus according to claim 32, wherein one of said bit allocation values determined for one of said plurality of subchannels differs from said bit allocation value determined for at least one of said remaining subchannels.

44. A data communication apparatus according to claim 32, wherein said bit allocation value determined for at least one of said plurality of subchannels is determined in accordance with one of said stored tables, and said bit allocation value for at least one other of said plurality of subchannels is determined in accordance with another of said stored tables.

45. A data communication apparatus according to claim 32, wherein said bit allocation values are determined in batches, each said batch being comprised of a predetermined quantity of said plurality of subchannels.

46. A data communication apparatus according to claim 32, wherein said bit allocation values are determined simultaneously for all of said plurality of subchannels.

47. A data communication apparatus according to claim 32, wherein said plurality of minimum signal-to-noise ratio values are on a linear scale.

48. A data communication apparatus according to claim 32, wherein said bit allocation value is a non-integer.

49. A data communication apparatus according to claim 32, wherein said bits to signal-to-noise ratio table comprises two separate tables and is stored as a first table and a second table, said first table is comprised of said plurality of minimum signal-to-noise ratio values and said corresponding plurality of respective bit values, and said second table is comprised of said signal-to-noise ratio values and said corresponding plurality of respective bit values.

50. A data communication apparatus for allocating bits to a plurality of transmission subchannels in a communication system, the data communication apparatus comprising:

a memory; and a processing unit, the processing unit controlling functions for:

measuring a signal-to-noise ratio for each of the plurality of transmission subchannels;

adjusting said measured signal-to-noise ratio in accordance with an SNR-margin and a coding gain;

generating a plurality of signal-to-noise ratio difference values;

selecting a bit allocation value for each of the plurality of transmission subchannels, said bit allocation value corresponding to one of said plurality of signal-to-noise ratio difference values;

determining a gain scaling factor for each of said plurality of transmission subchannels; and storing each of said bit allocation values and said gain scaling factors as one or more data structures in said memory.

51. A data communication apparatus according to claim 50, wherein each of said plurality of signal-to-noise ratio difference values is a difference between said adjusted measured signal-to-noise ratio for one of said plurality of transmission subchannels and a respective member of a first plurality of predetermined signal-to-noise ratio values.

52. A data communication apparatus according to claim 51, wherein said first plurality of corresponding predetermined signal-to-noise ratio values is determined by multiplying each respective member of a second plurality of predetermined signal-to-noise ratio values by a maximum allowable gain scaling factor.

53. A data communication apparatus according to claim 50, wherein said bit allocation selection step comprises the steps of:

searching said plurality of signal-to-noise ratio difference values to determine which of said values corresponds to a negative signal-to-noise ratio difference value having a smallest magnitude among said plurality of signal-to-noise ratio difference values; and establishing said bit allocation value as an index value corresponding to said determined value.

54. A data communication apparatus according to claim 50, further comprising the step of transmitting said data structures to a partner communication device.

55. A data communication apparatus according to claim 50, wherein said plurality of signal-to-noise ratio difference values are on a linear scale.

56. A data communication apparatus according to claim 50, further comprising the step of determining a fixed data rate.

57. A data communication apparatus according to claim 56, wherein said fixed data rate is determined by decreasing a number of allocated bits for one or more of the plurality of subchannels until a bit rate corresponding to said fixed data rate is achieved.

58. A data communication apparatus according to claim 57, wherein said subchannels are determined by selecting a one of said plurality of subchannels with the highest bits allocated, and in the case where more than one of said plurality of subchannels has the highest bits allocated selecting said one of said plurality of subchannels with the highest bits allocated and a largest gain scaling factor.

59. A data communication apparatus according to claim 50, wherein said bit allocation value is a non-integer.

60. A data communication apparatus according to claim 51, wherein said gain scaling factor is determined by dividing a signal-to-noise ratio corresponding said selected bit allocation value by said adjusted measured signal-to-noise ratio value.

* * * * *